(12) United States Patent
Cobb (10) Patent No.: US 7,226,167 B2
(45) Date of Patent: *Jun. 5, 2007

(54) AUTOSTEREOSCOPIC DISPLAY APPARATUS

(75) Inventor: Joshua M. Cobb, Victor, NY (US)

(73) Assignee: Eastman Kodak Company, Rochester, NY (US)

(*) Notice: Subject to any disclaimer, the term of this patent is extended or adjusted under 35 U.S.C. 154(b) by 234 days.

This patent is subject to a terminal disclaimer.

(21) Appl. No.: 10/854,116

(22) Filed: May 25, 2004

(65) Prior Publication Data

US 2005/0264761 A1    Dec. 1, 2005

(51) Int. Cl.
| | |
|---|---|
| G03B 21/00 | (2006.01) |
| G02B 27/22 | (2006.01) |
| G02B 27/24 | (2006.01) |
| G02B 27/14 | (2006.01) |
| H04N 13/04 | (2006.01) |
| G02F 1/1335 | (2006.01) |

(52) U.S. Cl. ............... 353/7; 353/8; 353/10; 359/462; 359/471; 359/479; 359/630; 348/42; 348/51; 349/11; 349/15

(58) Field of Classification Search ........... 353/7–10, 353/28, 34, 37, 94, 98, 99, 122; 359/385, 359/433, 434, 462, 464, 474, 651–655, 664, 359/665, 471, 478, 479, 630; 349/8, 11, 349/15; 345/8; 348/42, 46, 47, 51
See application file for complete search history.

(56) References Cited

U.S. PATENT DOCUMENTS

| | | | |
|---|---|---|---|
| 3,447,854 A | 6/1969 | Minter | 359/464 |
| 4,799,763 A | 1/1989 | Davis et al. | 359/472 |
| 5,477,385 A | 12/1995 | Freeman | 359/629 |
| 5,625,372 A | 4/1997 | Hildebrand et al. | 345/8 |
| 5,908,300 A | 6/1999 | Walker et al. | 434/43 |
| 5,976,017 A | 11/1999 | Omori et al. | 463/32 |
| 6,416,181 B1 | 7/2002 | Kessler et al. | 353/7 |
| 6,636,234 B2 | 10/2003 | Endo et al. | 345/646 |
| 6,674,881 B2 | 1/2004 | Bacus et al. | 382/128 |

FOREIGN PATENT DOCUMENTS

| | | |
|---|---|---|
| EP | 764 869 A2 | 3/1997 |
| EP | 1 267 197 A2 | 12/2002 |
| EP | 1 359 456 A2 | 11/2003 |
| WO | WO 02/101443 A2 | 12/2002 |

OTHER PUBLICATIONS

K. Hopf; "An Autostereoscopic Display Providing Comfortable Viewing Conditions and a High Degree of Telepresence"; IEEE Transactions on Circuits and Systems for Video Technology, vol. 10, No. 3, Apr. 2000, pp. 359-365.
S. Pastoor and M. Wopking; "3-D displays: A review of current technologies"; Displays 17 (1997), pp. 100-110.
S. McKay, S. Mason, L. Mair, P. Waddell, and S. Fraser; "Stereoscopic Display Using a 1.2-M Diameter Stretchable Membrane Mirror."

*Primary Examiner*—W. B. Perkey
(74) *Attorney, Agent, or Firm*—Nelson Adrian Blish (57) ABSTRACT

An autostereoscopic optical apparatus (10) for viewing a stereoscopic image comprising a left image to be viewed by an observer (12) at a left viewing pupil (**14*l*) and a right image to be viewed by the observer at a right viewing pupil (14*r*). A left image generation system (70*l*) forms a left curved intermediate image near the focal surface (22) of a curved mirror (24). A right image generation system (70*r*) forms a right intermediate image near the focal surface of the curved mirror. A center of curvature of the curved mirror is placed substantially optically midway between the exit pupil and the left optical system (110*l*) the exit pupil of the right optical system (110*r***). A beamsplitter is disposed between the focal surface and the center of curvature of the curved mirror.

15 Claims, 8 Drawing Sheets

AUTOSTEREOSCOPIC DISPLAY APPARATUS

CROSS REFERENCE TO RELATED APPLICATIONS

Reference is made to commonly-assigned copending U.S. patent application Ser. No. 10/393,236, filed Mar. 20, 2003, entitled METHOD AND APPARATUS FOR MONOCENTRIC PROJECTION OF AN IMAGE, by Joshua M. Cobb; and U.S. patent application Ser. No. 10/662,208, filed Sep. 12, 2003, entitled AUTOSTEREOSCOPIC OPTICAL APPARATUS by Cobb et al.; the disclosures of which are incorporated herein.

FIELD OF THE INVENTION

This invention generally relates to display apparatus and more particularly relates to an image generation apparatus for an autostereoscopic display providing a wide field of view, large left and right viewing pupils, and high brightness, with improved cost and reduced size.

BACKGROUND OF THE INVENTION

The potential value of autostereoscopic display systems is well appreciated for a broad range of data visualization uses and for a wide range of applications that include entertainment, engineering, medical, government, security, and simulation fields. Autostereoscopic display systems include "immersion" systems, intended to provide a realistic viewing experience for an observer by visually surrounding the observer with a three-dimensional (3-D) image having a very wide field of view. As differentiated from the larger group of stereoscopic displays that include it, the autostereoscopic display is characterized by the absence of any requirement for a wearable item of any type, such as goggles, headgear, or special polarized or filter glasses, for example. That is, an autostereoscopic display attempts to provide "natural" viewing conditions for an observer.

An article entitled "3-D displays: A review of current technologies" by Siegmund Pastoor and Mathias Wopking in *Displays* 17 (1997) surveys various approaches that have been applied for obtaining autostereoscopic display images for one or more viewers. Among the many techniques described in the Pastoor et al. article are electro-holography, volumetric display, direction-multiplexed, diffraction-based, refraction-based, and reflection-based methods for autostereoscopic presentation. While each of these approaches may have merit in one or more specific applications, these approaches have a number of characteristic shortcomings that constrain usability and overall performance. As a group, these conventional approaches have been adapted for autostereoscopic displays, but allow only a narrow field of view and provide limited brightness and poor contrast. Imaging systems employing time-based or spatial multiplexing require complex image processing algorithms in order to provide left- and right-eye images in the proper sequence or with the necessary spatial separation. Time-based multiplexing introduces the inherent problem of image flicker. Spatial multiplexing generally produces an image having reduced resolution. Combining these multiplexing techniques, as is disclosed in European Patent Application 764 869 A2 (Ezra et al.), may provide an increased number of views, but does not compensate for these inherent drawbacks. A number of multiplexing technologies also require tracking of view eye position and compensation for changes in head position. As a further disadvantage, each of the imaging technologies described in the Pastoor et al. article present the viewer with a real image, rather than with a virtual image, a distinction described in more detail subsequently.

In an article entitled "An Autostereoscopic Display Providing Comfortable Viewing Conditions and a High Degree of Telepresence" by Klaus Hopf in *IEEE Transactions on Circuits and Systems for Video Technology*, Vol. 10, No. 3, April, 2000, a teleconferencing system employing a spherical mirror is disclosed, recommended particularly for its value in reducing chromatic aberration. However, the optical system disclosed in this article is subject to field curvature constraints, limiting its field of view. Notably, the system described in the Hopf article provides a virtual image; however, due to substantial field curvature, the total field of view of such a system is limited to less than about 15 degrees. While such a narrow field of view may be acceptable for videoconferencing applications, this level of performance would not be useful for a desktop display system.

Three-dimensional (3-D) imaging systems using curved reflective surfaces to form real images are known. For example, U.S. Pat. No. 3,447,854 (Minter) discloses a 3-D viewer that employs a curved mirror acting as a field lens for shifting the position of the viewing pupil for separate left-eye and right-eye images. Similarly, in an article entitled "Stereoscopic Display Using a 1.2-M Diameter Stretchable Membrane Mirror" by McKay et al., a large curved mirror is used in conjunction with left and right beamsplitters for providing a real image, shifting a convergence point for left- and right-image disparity to some position along the primary optical axis relative to the curved mirror surface. Significantly, with both the U.S. Pat. No. 3,447,854 apparatus and the McKay et al. apparatus, the projected image is focused onto the surface of the curved mirror itself. With this arrangement, since the projected image is focused onto the curved mirror; the mirror itself does not form the image, but simply directs light into the pupils of the viewer. Because the mirror serves as the display surface for this type of real image projection system, optimal viewing conditions and large field of view are obtained when using a large curved mirror placed a good distance away from the viewer.

These prior art imaging systems display a real image as contrasted with a virtual image. It is important to clarify the distinction between real and virtual imaging. A real image is defined as an image that is either focused on a surface or focused in an accessible location. That is, a screen can be placed at the position of a real image in order to display the image.

Unlike real imaging projection, a virtual imaging system forms an image that is not focused at an accessible location. That is, a virtual image is not formed by projection onto a display surface; if a display surface were positioned at the perceived location of a virtual image, no image would be formed on that surface. Instead, a virtual image is formed by an optical system. A virtual image can be considered to be formed by the eye itself, forming an image according to light incident on the retina. A virtual image occurs, for example, when an object is between the focal point and the vertex of a concave mirrored surface.

Virtual imaging provides an advantageous alternative to real image projection in some types of applications. U.S. Pat. No. 5,625,372 (Hildebrand et al.) outlines a number of inherent advantages of virtual imaging over the alternative real imaging that is commonly used for image projection. As one significant advantage for stereoscopic viewing, the size of a virtual image is not limited by the size or location of a display surface. Additionally, the source object for a virtual image may be small. A magnifying glass, as a simple example, provides an enlarged virtual image of a small object. Print viewed through a magnifying glass not only appears larger, it also appears to be located substantially behind the surface of the page where the print actually exists. By definition, then, a virtual image can exist at a location where no display surface exists. Thus, it can be seen that, in comparison with prior art systems that project a real image, a more realistic viewing experience can be provided by forming a virtual image that is formed so as to appear some distance away. Providing a virtual image also obviates the need to compensate for screen artifacts, as may be necessary when projecting a real image.

It is instructive to point out that the term "virtual image" is itself often casually misused in patent and related literature about immersive imaging systems and other apparatus that are often described as "virtual reality" systems. As one example, U.S. Pat. No. 5,976,017 (Omori et al.) makes a number of references to "virtual image" using the casual interpretation of this term as simply some type of electronically generated image, rather than using the definition understood by the optics practitioner. (Other examples of this unfortunate, casual use of the term "virtual image" can be easily found in the patent literature; as just a few additional examples, see U.S. Pat. No. 6,636,234 (Endo et al.) and U.S. Pat. No. 6,674,881 (Bacus et al.), both of which use the term "virtual image" in its casual sense, rather than holding to the definition used in optics.) In the disclosure of the present application, the term "virtual image" is used in its true optical sense.

It is generally recognized that, in order to minimize vergence/accommodation effects, a 3-D viewing system should display its pair of stereoscopic images, whether real or virtual, at a relatively large distance from the observer. For real image projection, this means that a large display surface must be employed, preferably placed a good distance from the observer. For virtual images, however, a relatively small curved mirror can be used as is disclosed in U.S. Pat. No. 5,908,300 (Walker et al.). The curved mirror in a virtual imaging system acts as a collimator, forming a virtual image that appears to be at a relatively large distance from the observer. In terms of focus, the image formed in such a virtual imaging system appears to be at infinity.

From an optical perspective, it can be seen that there would be advantages to autostereoscopic design using pupil imaging. A system designed for pupil imaging must meet a fairly demanding set of requirements, including the following:

(a) form separate images at left and right pupils correspondingly;
(b) provide the most natural viewing conditions possible, eliminating any need for goggles or special headgear;
(c) present the largest possible pupils to the observer, while limiting crosstalk between left and right views;
(d) allow the observer a reasonable freedom of movement;
(e) provide an ultra-wide field of view; and
(f) provide sufficient resolution for realistic imaging, with high brightness and contrast.

It is recognized in the optical arts that each of these requirements, by itself, can be difficult to achieve. An ideal autostereoscopic imaging system must meet the challenge of each of these requirements to provide a more fully satisfactory and realistic viewing experience. Moreover, additional physical constraints presented by the need for a system to have small footprint, and dimensional constraints for interocular separation must be considered, so that separate images directed to each eye can be advantageously spaced and correctly separated for viewing. It is instructive to note that interocular distance constraints limit the ability to achieve larger pupil diameter at a given ultrawide field by simply scaling the projection lens.

Clearly, the value and realistic quality of the viewing experience provided by an autostereoscopic display system using pupil imaging is enhanced by presenting the stereo 3-D image with a wide field of view and large exit pupil. For fully satisfactory 3-D viewing, such a system should provide separate, high-resolution images to right and left eyes. To create a realistic illusion of depth and width of field, the observer should be presented with a virtual image that requires the viewer to focus at some distance.

It is well known that conflict between depth cues associated with vergence and accommodation can adversely impact the viewing experience. Vergence refers to the degree at which the observer's eyes must be crossed in order to fuse the separate images of an object within the field of view. Vergence decreases, then vanishes as viewed objects become more distant. Accommodation refers to the requirement that the eye lens of the observer change shape to maintain retinal focus for the object of interest. It is known that there can be a temporary degradation of a viewer's depth perception when the viewer is exposed for a period of time to mismatched depth cues for vergence and accommodation. It is also known that this negative effect on depth perception can be mitigated when the accommodation cues correspond to distant image position.

There are also other basic optical limitations for immersion systems that must be addressed with any type of optical projection that provides a wide field of view. An important limitation is imposed by the Lagrange invariant. A product of the size of the emissive device and the numerical aperture, the Lagrange invariant determines output brightness and is an important consideration for matching the output of one optical system with the input of another. Any imaging system conforms to the Lagrange invariant, whereby the product of pupil size and semi-field angle is proportional to the product of the image size and the numerical aperture. An invariant that applies throughout the optical system, the Lagrange invariant can be a limitation when using, as an image generator, a relatively small spatial light modulator or similar pixel array which operate over a relatively small numerical aperture, since the Lagrange value associated with the device is small. In practical terms, the larger the size of the image source, the easier it is to form an image having a wide field of view and large pupil.

In response to the need for more realistic autostereoscopic display solutions offering a wide field of view, commonly-assigned U.S. Pat. No. 6,416,181 (Kessler et al.), incorporated herein by reference and referred to as the '181 patent, discloses an autostereoscopic imaging system using pupil imaging to display collimated left and right virtual images to a viewer. In the '181 disclosure, a curved mirror is employed in combination with an imaging source, a curved diffusive surface, a ball lens assembly, and a beamsplitter, for providing the virtual image for left and right viewing pupils. Overall, the monocentric optical apparatus of the '181 disclosure provides autostereoscopic imaging with large viewing pupils, a very wide field of view, and minimal aberration.

While the autostereoscopic system of the '181 disclosure provides a high-performance immersive display, there is still room for improved embodiments. For example, while the '181 system provides a large viewing pupil, there would be advantages in obtaining even further increases in pupil size.

Generating its source image on a small spatial light modulator device, the '181 system overcomes inherent Lagrange invariant conditions by forming an intermediate curved image for projection on a curved diffusive surface. Use of the diffuser with the '181 apparatus is necessary because the image-forming device, typically a reflective liquid crystal on silicon (LCOS) or other spatial light modulator, is a relatively small image source device, measuring typically no more than about 1 inch square. At the same time, however, the use of a diffusive surface effectively reduces overall brightness, introduces some level of graininess to the image, and limits the achievable contrast.

Subsequent commonly-assigned applications have addressed the need for more compact autostereoscopic apparatus providing pupil imaging with virtual images and for achieving improved brightness levels. For example, U.S. patent application Ser. No. 10/662,208, cited above, discloses improved apparatus and methods for forming curved left and right intermediate images, using an approach that eliminates the need for use of a diffusive surface and allows the use of larger image sources which are able to provide additional brightness.

Although there is considerable interest in the enhanced display quality that true autostereoscopic virtual imaging affords, there remain a number of hurdles to widespread commercialization of compact, autostereoscopic displays suitable for desktop applications. There would be particular value in improvements that reduce cost and size and increase brightness, provide more natural viewing conditions, and enhance overall image quality.

Thus, it can be seen that there is a need for an improved autostereoscopic imaging apparatus that provides improved brightness, enhanced viewing pupil dimensions, reduced image aberrations, and higher resolution, at reduced size and cost.

SUMMARY OF THE INVENTION

It is an object of the present invention to provide an autostereoscopic display device having improved viewing pupil size, brightness, and resolution, with reduced optical aberrations at reduced size and cost. With this object in mind, the present invention provides an autostereoscopic optical apparatus for viewing a stereoscopic image comprising a left image to be viewed by an observer at a left viewing pupil and a right image to be viewed by the observer at a right viewing pupil, the apparatus comprising:

(a) a left image generation system for forming a left curved intermediate image near the focal surface of a curved mirror, the left image generation system comprising:
  (i) a left image source for forming a left source image;
  (ii) a left optical system comprising at least one lens for collecting light from the left image source and a left image folding surface for directing the collected light to form the left curved intermediate image, wherein the left optical system forms an exit pupil optically centered near the center of curvature of the left curved intermediate image;

(b) a right image generation system for forming a right curved intermediate image near the focal surface of the curved mirror, the right image generation system comprising:
  (i) a right image source for forming a right source image;
  (ii) a right optical system comprising at least one lens for collecting light from the right image source and a right image folding surface for directing the collected light to form the right curved intermediate image, wherein the right optical system forms an exit pupil optically centered near the center of curvature of the right curved intermediate image;

(c) the center of curvature of the curved mirror placed substantially optically midway between the exit pupil of the left optical system and exit pupil of the right optical system;

(d) a beamsplitter disposed between the mirrored surface and the center of curvature of the curved mirror, the curved mirror and beamsplitter cooperating to form, at the left viewing pupil:
  (i) a real image of the exit pupil of the left optical system; and
  (ii) an image of the left curved intermediate image that appears to be behind the curved mirror;

the curved mirror and beamsplitter further cooperating to form, at the right viewing pupil:
  (i) a real image of the exit pupil of the right optical system; and
  (ii) an image of the right curved intermediate image that appears to be behind the curved mirror.

From another aspect, the present invention provides an autostereoscopic optical apparatus for viewing a stereoscopic virtual image comprising a left image to be viewed by an observer at a left viewing pupil and a right image to be viewed by the observer at a right viewing pupil, the apparatus comprising:

(a) a left image generation system and a right image generation system, each image generation system comprising:
  (i) an image source for forming a source image;
  (ii) an optical system comprising at least one lens for collecting light from the image source and an image folding surface for directing the collected light to form a curved intermediate image, wherein the optical system forms an exit pupil optically centered near the center of curvature of the curved intermediate image;

(b) a beamsplitter disposed to form the curved intermediate image of the left image generation system near the focal surface of a left curved mirror and to form the curved intermediate image of the right image generation system near the focal surface of a right curved mirror;

wherein the left curved mirror has a center of curvature substantially coincident with the exit pupil of the left optical system for the left image generation system;

wherein the right curved mirror has a center of curvature substantially coincident with the exit pupil of the right optical system for the right image generation system;

wherein the beamsplitter cooperates with the left curved mirror to form, at the left viewing pupil, a real image of the exit pupil of the left optical system for the left image generation system and an image of the curved intermediate image formed by the left image generation system that appears to be behind the left curved mirror; and wherein the beamsplitter cooperates with the right curved mirror to form, at the right viewing pupil, a real image of the pupil of the optical system for the right image generation system and an image of the curved intermediate image formed by the right image generation system that appears to be behind the right curved mirror.

It is a feature of the present invention that it provides an autostereoscopic imaging display apparatus that forms an intermediate image without the need for curved diffusive surfaces. This allows image brightness to be optimized and allows improved contrast over other design solutions.

It is an advantage of the invention that a beamsplitter is not required for forming the curved intermediate image. This improves display brightness and eliminates aberrations that can be induced by such a beamsplitter.

It is an advantage of the present invention that it enables the use of a larger imaging display than previous solutions, relaxing Lagrange invariant constraints on available luminance.

It is a further advantage of the present invention that it provides a large viewing pupil.

It is a further advantage of the present invention that it provides a compact autostereoscopic display system providing a virtual image. The apparatus of the present invention overcomes constraints on the placement and size of projection apparatus for left- and right-eye images by folding the image path at an optimal location. Thus, conventional projection systems having relatively large lenses can be used for forming stereoscopic images.

It is yet a further advantage of the present invention that it provides options to highly spherical lenses, such as ball lenses and ball lens segments, using an alternate approach to image-forming optics that generate curved images.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

For the purposes of the present application, a curved image is an image for which best focus lies in a shape that is substantially spherical. The optical path is simplest when curved images are themselves spherically curved. By forming and using curved intermediate images, for example, rather than flat, planar images, the optics of the present invention take advantage of various symmetrical arrangements and relationships that are favorable for pupil imaging using virtual images, as is described in this section.

Similarly, for reasons that become apparent upon reading this detailed description, a curved mirror, as described in this application, is preferably spherical, having a single center of curvature.

Figure 1:
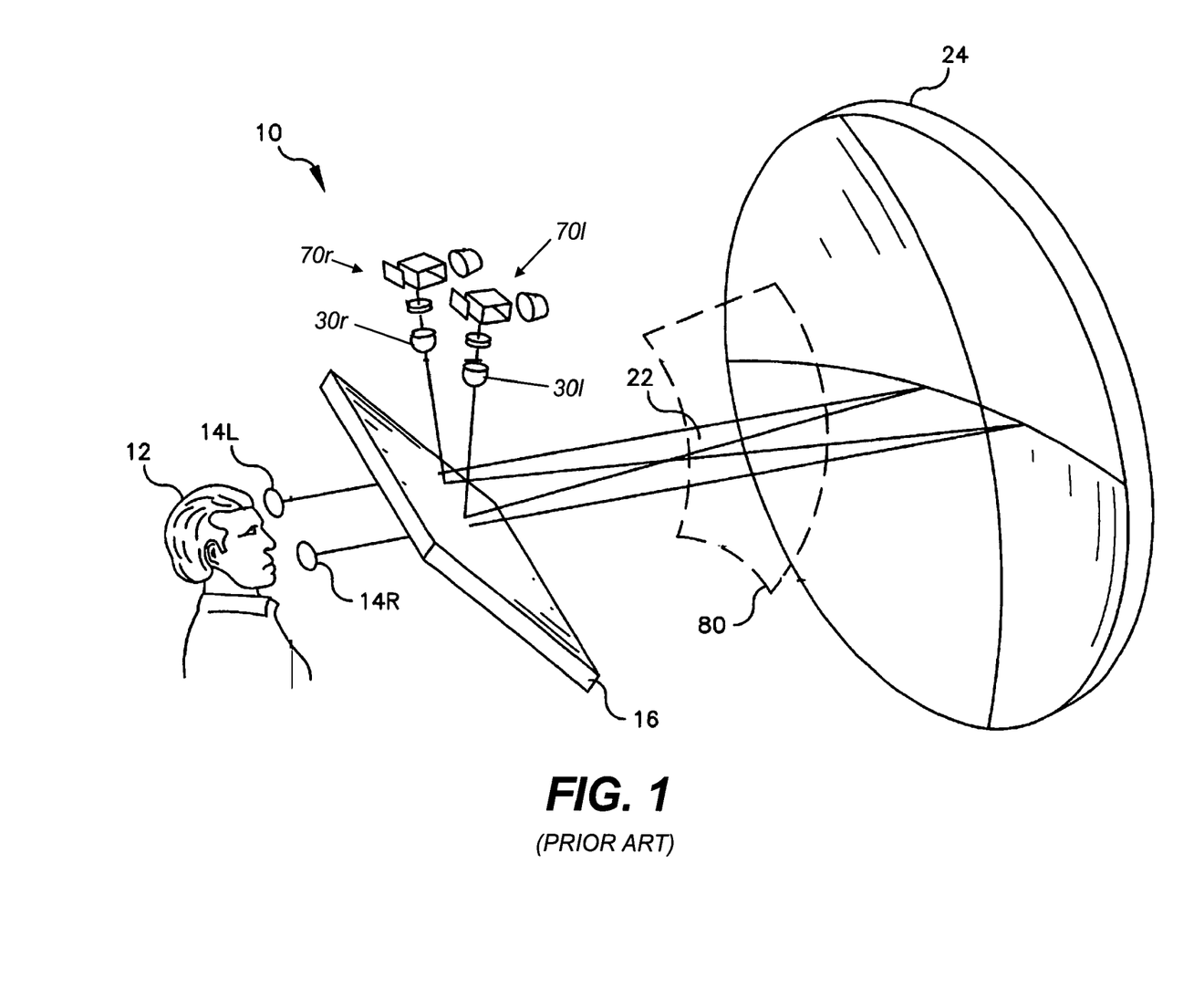
FIG. 1 shows a prior art autostereoscopic display system using pupil imaging to provide a virtual image.

In the prior art autostereoscopic projection apparatus 10 described in U.S. Pat. No. 6,416,181 and as shown in FIG. 1, a curved mirror 24 is employed, in combination with a beamsplitter 16 to provide an autostereoscopic virtual image to a viewer 12 at left and right viewing pupils 14*l* and 14*r*. For each viewing pupil 14*l* and 14*r*, the virtual image that is formed appears as if positioned behind curved mirror 24. For both left and right viewing pupils 14*l* and 14*r*, a corresponding image generation system 70*l* and 70*r* provides an initial intermediate curved image that is then projected through a corresponding left or right ball lens assembly 30*l*, 30*r* in order to form an intermediate curved image 80 near a focal surface of curved mirror 24. As FIG. 1 shows, the left and right optical paths cross between beamsplitter 16 and curved mirror 24, due to the nature of imaging using curved mirror 24. Beamsplitter 16 is disposed between the mirrored surface and the center of curvature of curved mirror 24. It is important to note that because left and right intermediate curved images 80 have centers of curvature that are not quite coincident, the actual intermediate curved images 80 cannot lie perfectly on each other, nor lie perfectly on the focal surface of curved mirror 24.

Figure 2:
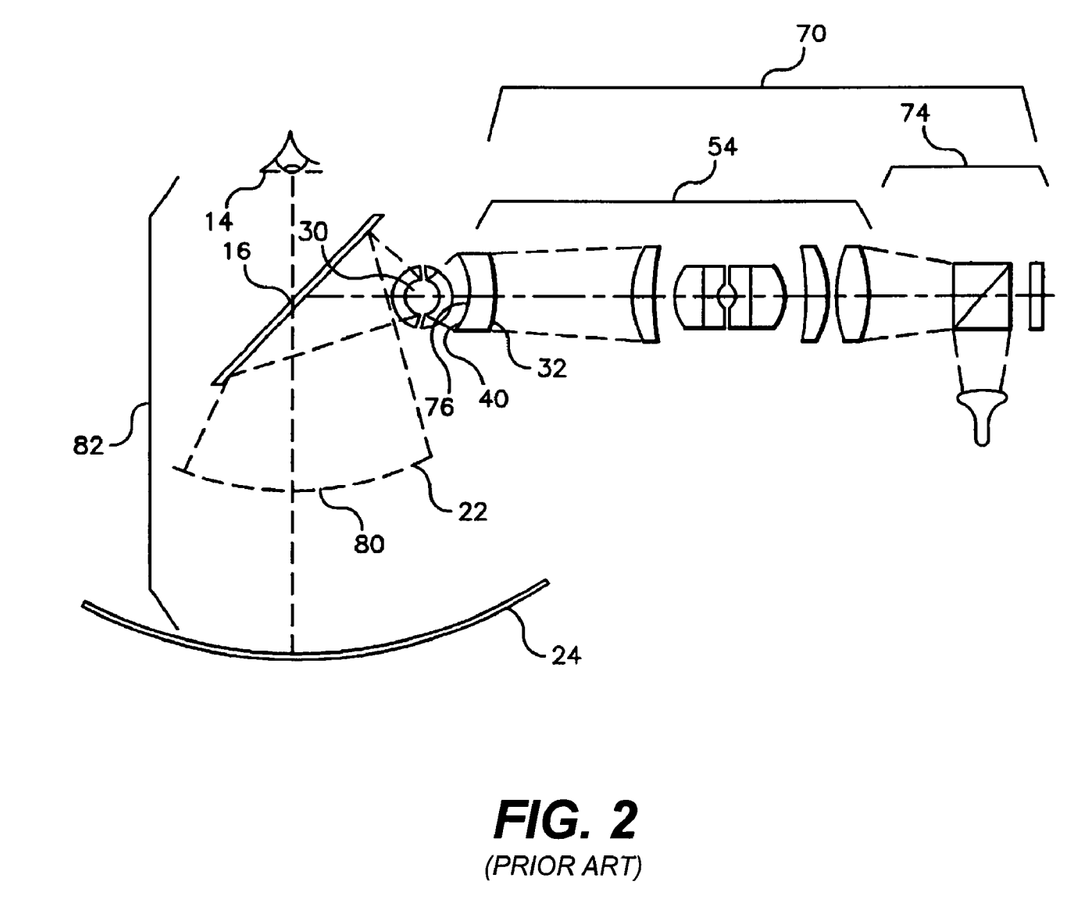
FIG. 2 shows a detailed view of image generation system components for the prior art system of FIG. 1.

Referring to FIG. 2, there is shown, extracted from the more detailed prior art description of the '181 disclosure noted in the background section above, a portion of an image generation system 70 that cooperates with ball lens assembly 30 for providing intermediate curved image 80 for projection in a stereoscopic projection system 82 for one viewing pupil 14. Here, an image generator 74 provides a source image from a flat surface, such as from a reflective LCOS spatial light modulator. A relay lens 54 directs light from image generator 74 onto a diffusing element 32, so that a curved intermediate image 76 is formed on a diffusive surface 40. Ball lens assembly 30, cooperating with beamsplitter 16, then projects curved intermediate image 76 toward a front focal surface 22 of curved mirror 24 to form intermediate curved image 80. Curved mirror 24 then provides a virtual image of intermediate curved image 80 for a viewing pupil 14.

Forming a Curved Intermediate Image

While image generation system 70, ball lens assembly 30 and beamsplitter 16 as shown in FIGS. 1 and 2 provide intermediate curved image 80 having suitable curvature and at the optimal exit pupil location for forming a virtual image that appears to be behind curved mirror 24, there are other methods for forming intermediate curved image 80. The crux of the present invention is an alternate apparatus and method for forming curved intermediate image 80 without the need for any additional beamsplitters, which can introduce minor imaging aberrations and reduce brightness, and without the requirement for ball lens optics, such as are used with the prior art arrangement of FIGS. 1 and 2. Moreover, the apparatus of the present invention allows the deployment of more conventional projection optics with an autostereoscopic virtual imaging system.

Figure 3:
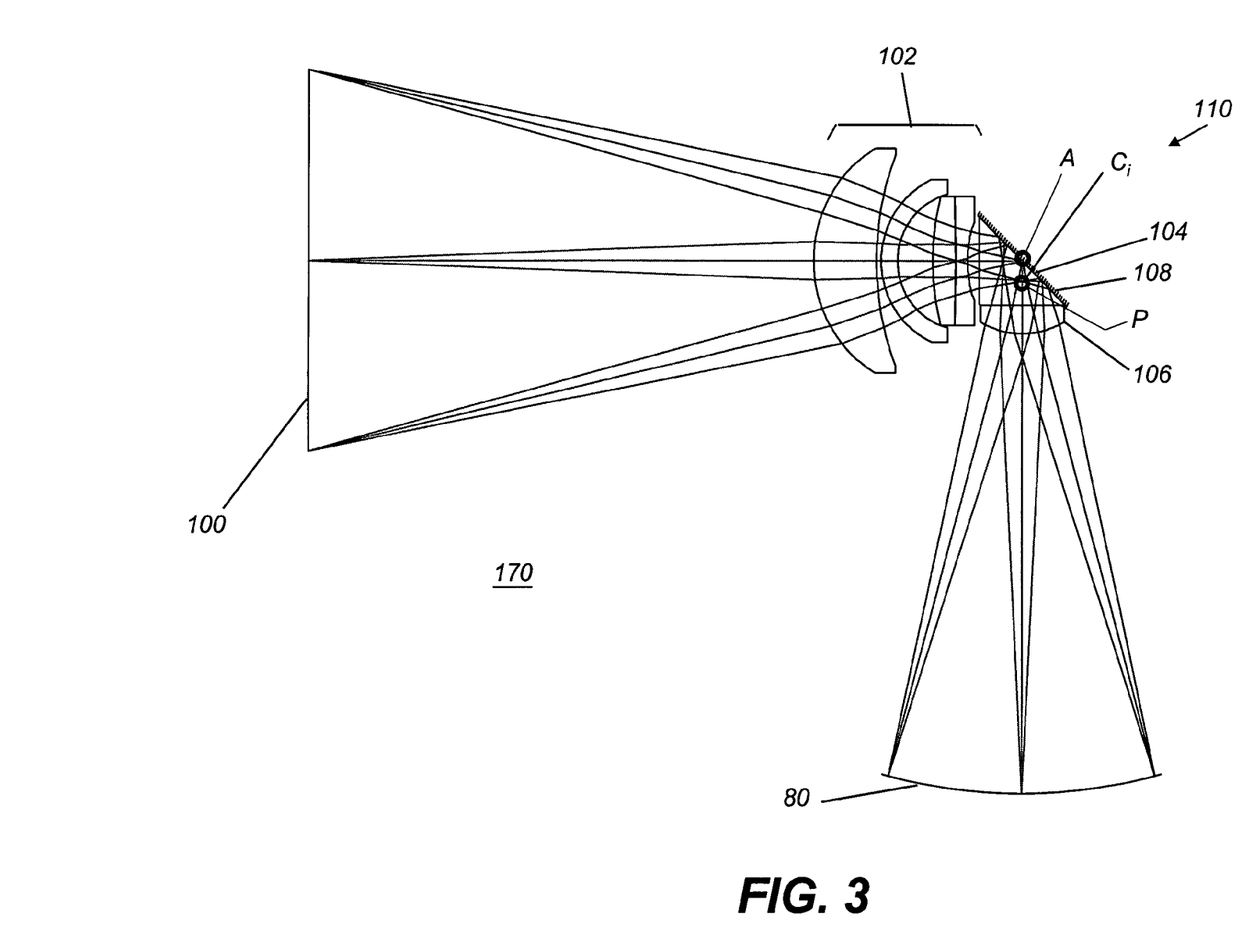
FIG. 3 is a side view showing the basic components and optical behavior of an image generation system according to the present invention.
Figure 8:
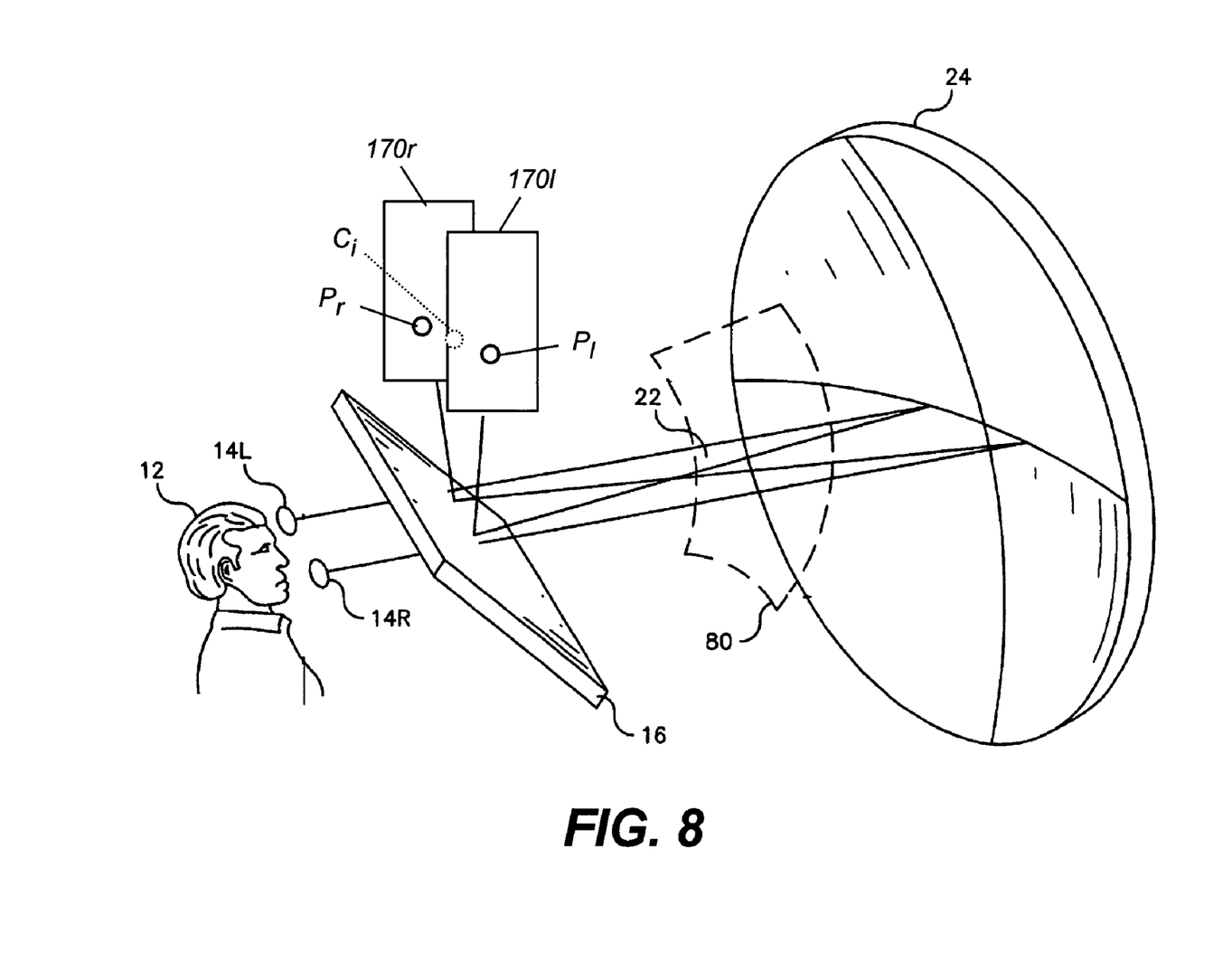
FIG. 8 is a perspective view showing the basic components and optical behavior of an image generation system in a single-mirror embodiment according to the present invention.

Referring to FIG. 3, there is shown, in cross-sectional side view, an image generation system 170 in one embodiment of the present invention. With reference to autostereoscopic projection apparatus 10 shown in FIG. 1, one image generation system 170 of FIG. 3 could be substituted for each of left and right image generation systems 70*l* and 70*r* with their corresponding left and right ball lens assemblies 30*l* and 30*r*. This alternate arrangement is shown in FIG. 8. That is, image generation system 170 cooperates with beamsplitter 16 to form intermediate curved image 80.

In image generation system 170 of FIG. 3, an image source 100 provides modulated light to an optical assembly 110. Optical assembly 110 has entrance optics 102, typically a compound lens as shown in FIG. 3, optically coupled with a turning prism 104 having a reflective surface 108 that redirects light from entrance optics 102 to form intermediate image 80. Turning prism 104 has an output lens 106, typically a plano-convex lens as shown. Here, reflective surface 108 is a coated surface of turning prism 104 for reflecting light incident from entrance optics 102. It is important to observe that the mirrored surface of the prism is at the aperture stop A of image generation system 170. In this embodiment, the location of the exit pupil P of image generation system 170 depends on the focal length of output lens 106 and on the thickness and material of prism 104. Exit pupil P can be coincident with aperture stop A, at reflective surface 108. (Coincidence of exit pupil P and aperture stop A holds true, for example, with ball lens assembly 30 in the prior art embodiment of FIG. 1.) With the arrangements of FIGS. 4–8, for example, pupil P is located within about 12 mm of aperture stop A.

Ideally, the center of curvature $C_i$ of intermediate curved image 80 lies on pupil P as is shown in FIG. 3. With this arrangement, the optics of image generation system 170 can be made highly compact, since aperture stop A has a relatively small area. As is described subsequently, folding the imaging path at aperture stop A provides a compact configuration that is particularly advantaged for pupil imaging.

The use of turning prism 104 also provides optical assembly 110 with the advantage of a shortened optical path length around the aperture stop location, particularly where a high index glass or other high index material is used. The materials used for turning prism 104, entrance optics 102, and output lens 106 need not be the same and need not be in physical contact with one another.

System Embodiment

Figure 4:
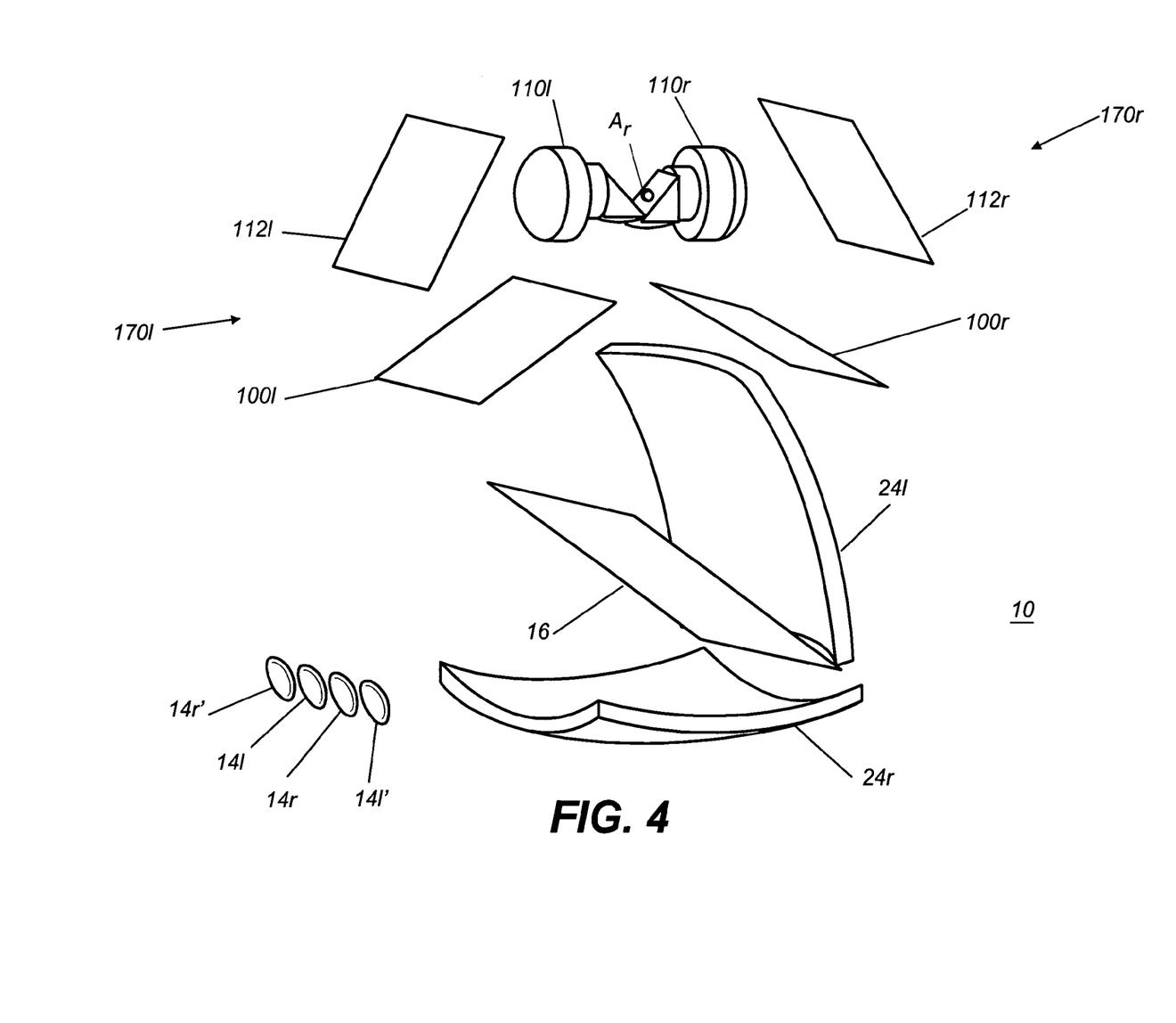
FIG. 4 is a perspective view of the basic components of an autostereoscopic imaging system using the image generation system of the present invention.

In order to better understand the operation and advantages of the present invention, it is useful to consider how optical assembly 110 is used in an autostereoscopic system. Referring to the single-mirror embodiment of FIG. 8, curved mirror 24 is slightly off center from both left exit pupil $P_l$ and right exit pupil $P_r$. This off-center condition causes keystone distortion in the left virtual image and an opposing keystone distortion in the right virtual image. This distortion can be corrected by electronically pre-distorting the image data provided to left image source and to the right image source 100*r*, using image data manipulation techniques that are well known in the digital imaging art. Referring now to FIG. 4, there is shown an alternate embodiment that minimizes keystone distortion in the virtual images formed, since each exit pupil is on axis relative to its own curved mirror. In autostereoscopic display apparatus 10 of FIG. 4, left and right optical assemblies 110*l* and 110*r* are configured respectively as part of left and right image generation systems 170*l* and 170*r*, according to the present invention. Left and right image sources 100*l* and 100*r* form the separate left and right source images for display. In the embodiment of FIG. 4, left and right turning mirrors 112*l* and 112*r*, respectively, direct light from image source 100*l* and 100*r* to the corresponding left and right optical assemblies 110*l* and 110*r*. Left and right optical assemblies 110*l* and 110*r*, cooperating with beamsplitter 16, then form intermediate curved images 80 (as described with reference to FIG. 1, but not shown in FIG. 4) at the focal surfaces of left and right curved mirrors 24*l* and 24*r*. Left and right curved mirrors 24*l* and 24*r* then provide, again through beamsplitter 16, virtual images that can be viewed at left and right viewing pupils 14*l* and 14*r*. To the viewer at left and right viewing pupils 14*l* and 14*r*, the left and right virtual images formed with this arrangement appear to be behind left and right curved mirrors 24*l* and 24*r* respectively.

Left and right viewing pupils can range in size from 20 mm to 55 mm. When the component arrangement of FIG. 4 is used, there are also duplicate left and right viewing pupils 14*l'* and 14*r'*. In practice, viewing pupils 14*l* and 14*r* that are actually used lie between duplicate left and right viewing pupils 14*l'* and 14*r'* as is represented in FIG. 4.

With respect to the arrangement of FIG. 4, it must be observed that left and right turning mirrors 112*l* and 112*r* are optional, depending on the relative locations of left and right image sources 100*l* and 100*r*. In this arrangement, the image orientation presented to the viewer will be identical to that appearing on image sources 100*l* and 100*r*. Without turning mirrors 112*l* and 112*r*, a mirror image of the scene must be generated on image sources 100*l* and 100*r*. Either the single mirror arrangement of FIG. 8 or the dual mirror arrangement of FIG. 4 could be used with left and right image generation systems 170*l* and 170*r* of the present invention.

Importance of Spatial Relationships

There are a number of spatial relationships that have particular importance for obtaining optimal imaging conditions when using left and right image generation systems 170*l* and 170*r* of the present invention. As noted hereinabove with reference to FIG. 3, the coincidence of center of curvature $C_i$ of intermediate curved image 80 and pupil P is advantageous. Other key spatial relationships depend on the positioning of left and right optical assemblies 110*l* and 110*r* relative to each other. This positioning is best described with reference to the side, top, and perspective views of left and right optical assemblies 110*l* and 110*r* shown in FIGS. 5, 6, and 7 respectively.

Figure 5:
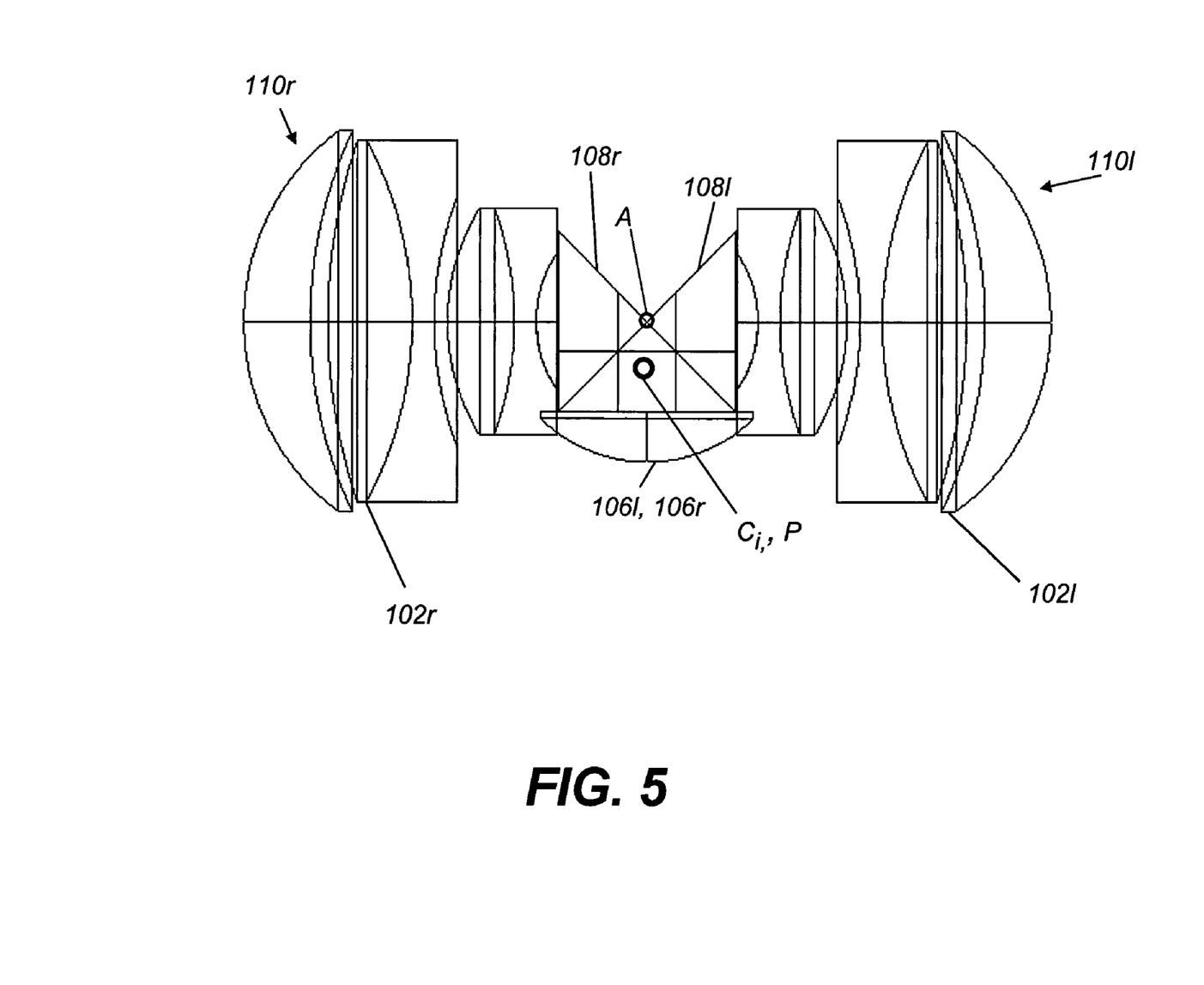
FIG. 5 is a side view showing left and right image generation systems.
Figure 6:
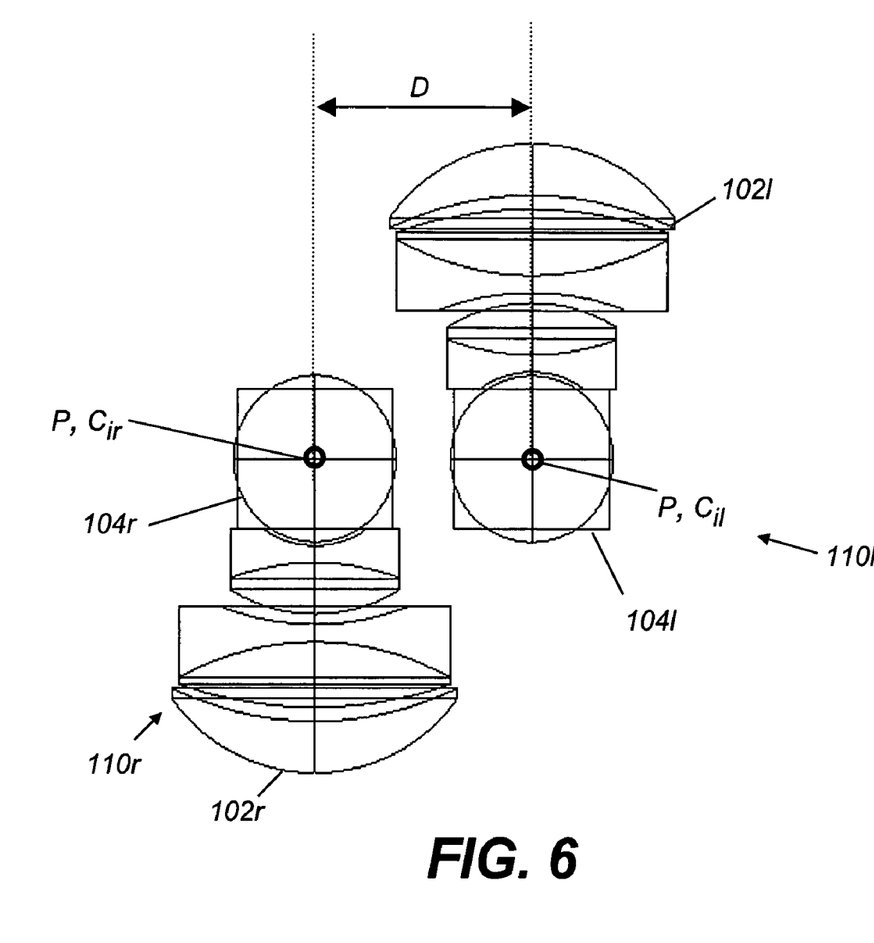
FIG. 6 is a top view showing left and right image generation systems.

In the side view of FIG. 5, center of curvature $C_i$ of intermediate curved image 80 is coincident with pupil P, which is between aperture stop A on left and right reflective surfaces 108*l* and 108*r* and lenses 106*l* and 106*r*. FIG. 6 shows the position of left and right centers of curvature $C_{il}$ and $C_{ir}$ and their coincident pupils $P_l$ and $P_r$ from a top view. For the single curved mirror 24 embodiment of FIG. 8, the center of curvature $C_i$ of curved mirror 24 ideally lies midway between left and right pupils $P_l$ and $P_r$. For the dual curved mirror 24*l*, 24*r* embodiment of FIG. 4, each center of curvature $C_{il}$ and $C_{ir}$ is ideally coincident with the corresponding center of curvature of curved mirror 24*l*, 24*r*.

Figure 7:
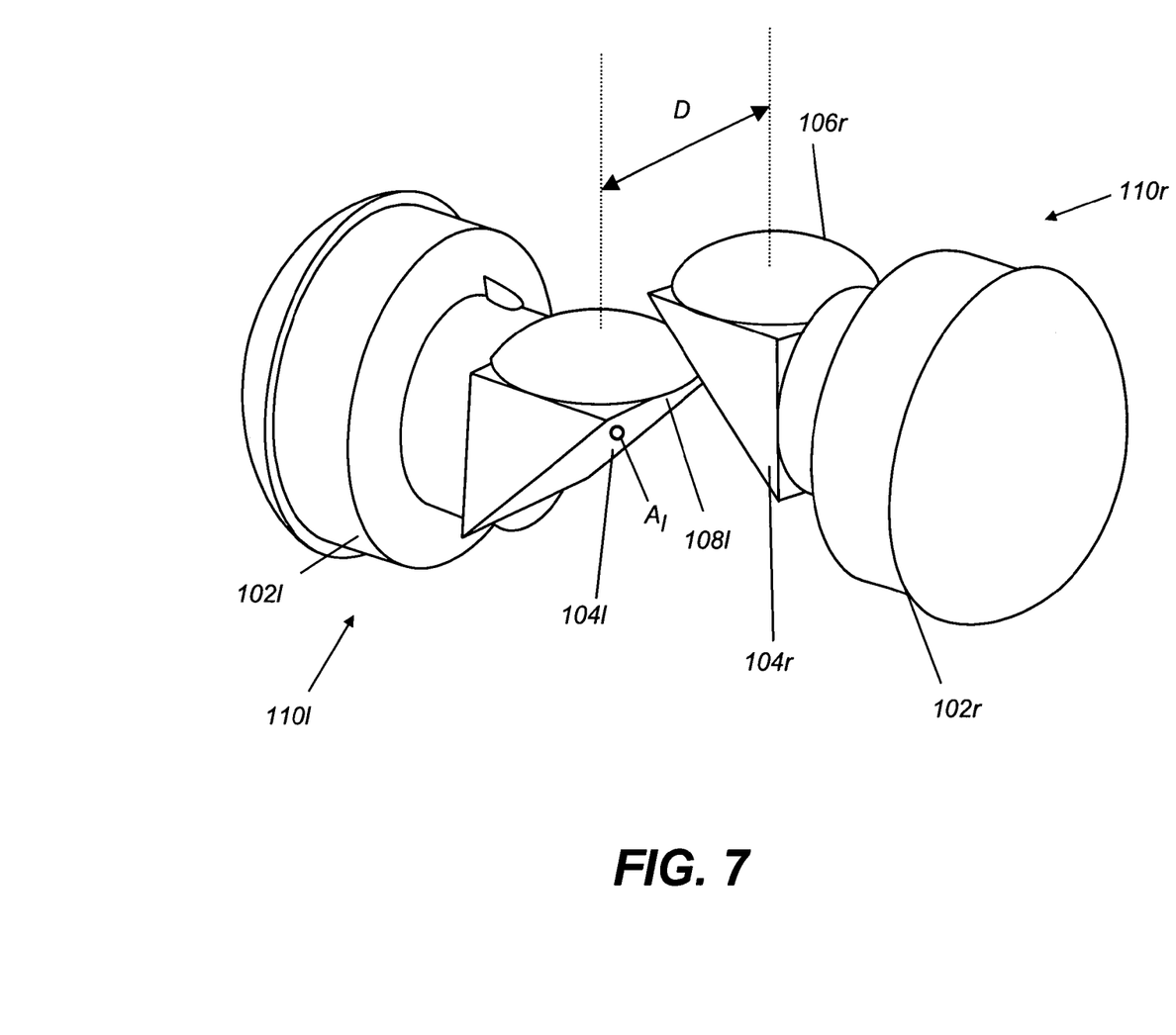
FIG. 7 is a perspective view showing left and right image generation systems.

Another key spatial relationship relates to the interocular distance of viewer 12 (FIG. 1). As is shown in FIGS. 6 and 7, the arrangement of left and right optical assemblies 110*l* and 110*r* enables them to be positioned closely together within autostereoscopic display apparatus 10, separated by a distance D. For 1:1 imaging, distance D can be set to closely approximate the interocular distance of viewer 12, which is typically in the range of 5–8 cm. An adaptive arrangement would even allow dynamic adjustment of separation distance D to suit an individual viewer 12. (Left entrance optics is 102*l* and right entrance optics is 102*r*. Left and right turning prisms are 104*l* and 104*r* respectively.)

It must be emphasized that the arrangement shown in FIGS. 4–8 achieves compactness by folding the imaging path at aperture stop A. At this point, the imaging beam is at a minimum width. With the optical path folded at this point, the apparatus used to form left and right source images can be any suitable projection device and can have output lenses with diameters in the 65–200 mm range.

In summary, where a single curved mirror 24 is used with left and right image generation systems 170*l* and 170*r* of the present invention, a central point midway between left and right pupils $P_l$ and $P_r$, or left and right image centers of curvature $C_{il}$ and $C_{ir}$, corresponds to the center of curvature of curved mirror 24. Where paired left and right curved mirrors 24*l* and 24*r* are used, left and right centers of curvature $C_{il}$ and $C_{ir}$, each correspond to the appropriate center of curvature of the corresponding left or right curved mirror 24*l* or 24*r*. The curved intermediate images formed have centers of curvature coincident with left and right pupils $P_l$ and $P_r$.

Optimal imaging performance is obtained when the spatial relationships described hereinabove are obtained. However, in practice, some tolerance would be allowable. For example, with reference to FIGS. 1, 3, and 4, intermediate curved image 80 need not be precisely spherical in curvature to provide reasonable image quality. Similarly, curved mirrors 24 and 24*l*, 24*r* may vary somewhat from spherical curvature, yet provide adequate imaging performance. Excessive variation from spherical curvature, however, will result in unsatisfactory imaging and can even prevent the formation of virtual images that would be visible at viewing pupils 14*l* and 14*r*.

Types of Image Source

Using the overall arrangement of FIGS. 3 and 4, image source 100 can be any of a number of image sources that emit modulated light, such as a projector, a display LCD, a CRT, an LED matrix, or an OLED or PLED device, for example. Two characteristics of image source 100 are particularly significant with this arrangement:

(i) The image formed on image source 100 is substantially flat. There may be some slight curvature to this image, such as would be provided by a CRT; however, the arrangement of FIGS. 3 and 4 work well when image source 100 is flat and shows how intermediate curved image 80 is formed having a curvature using the methods of the present invention. Since most image display devices form a flat image, there is, then, no need for modification to off-the-shelf display components with this arrangement.

(ii) Image source 100 can be several inches in diameter, and may be well over one foot in diameter. In a preferred embodiment, image source 100 is a large LCD display, such as a 17-inch display, for example. This is unlike other apparatus for forming a curved intermediate image, such as was shown with reference to FIG. 2, for which a microdisplay, such as a liquid crystal on silicon (LCOS) or DMD component, is used. Use of a larger display device for image source 100 has particular advantages for increasing both image resolution and brightness.

As described with reference to the Lagrange invariant in the background section above, brightness in an optical system is a product of the emissive area and the solid angle into which light is emitted. By allowing image source 100 to have a large emissive area, the method of the present invention allows substantial brightness levels while, at the same time, allowing light angles to be relatively small. Small light angles are advantageous for maximizing image contrast and minimizing color shifting and other related image aberrations.

As shown in FIG. 4, separate image sources 100*l* and 100*r* are used for left and right eyes, respectively. Ideally, image source 100*l* for left image generation system 170*l* and image source 100*r* for right image generation system 170*r* are well-matched for image size and color. CRT displays, however, may be at a disadvantage if used as image sources 100. Color differences between CRTs may degrade stereoscopic imaging performance. Additionally, as a result of display ageing, CRT image areas may vary dimensionally, effectively causing left/right pixel misalignment. In contrast to CRT displays, LCD displays offer improved dimensional stability with stable pixel locations, ease of alignment, and simpler mounting.

It can be seen that the use of image generation system 170 according to the present invention provides an alternative to the ball lens segments disclosed in the U.S. Pat. No. 6,416,181 referenced above, eliminating the need for corrective optics to support the spherical ball lens. Image generation system 170 does not require auxiliary beamsplitters or other highly specialized optics for forming left and right curved intermediate images. A wide range of image sources 100 can be used, easing constraints imposed by the Lagrange invariant, as was noted in the background section given above. The image path can be folded at a convenient point for optimizing interocular separation. Thus, image generation system 170 provides a compact solution for imaging optics in an autostereoscopic system, enabling reductions in both size and cost.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, image source 100, a transmissive LCD device in one embodiment, can be any of a number of types of image source, including film projector, CRT, LCD, and digital imaging devices. Image source 100 could be an emissive array, such as an organic light emitting diode (OLED) array, for example. In order to take advantage of the benefits of monocentric imaging, curved mirror 24 or pair of curved mirrors 24*l*/24*r* will be substantially spherical in most embodiments; however, some slight shape modifications might be used, with the corresponding changes to supporting optics. Curved mirror 24 or 24*l*, 24*r* could be fabricated as a highly reflective surface using a number of different materials.

Thus, what is provided is an apparatus and method for autostereoscopic image display having improved brightness, pupil size, and resolution in a compact design.

Parts List 10 autostereoscopic display apparatus
12 viewer
14 viewing pupil
14*l* left viewing pupil
14*l'* left viewing pupil
14*r* right viewing pupil
14*r'* right viewing pupil
16 beamsplitter
22 front focal surface
24 curved mirror
24*l* curved mirror, left
24*r* curved mirror, right
30 ball lens assembly
30*l* ball lens assembly, left
30*r* ball lens assembly, right
32 diffusing element
40 diffusive surface
54 relay lens
70 image generation system
70*l* left image generation system
70*r* right image generation system
74 image generator
76 curved intermediate image
80 intermediate curved image
82 stereoscopic projection system
100 image source
100*l* left image source
100*r* right image source
102 entrance optics
102*l* left entrance optics
102*r* right entrance optics
104 turning prism
104*l* left turning prism
104*r* right turning prism
106 output lens
106*l* left output lens
106*r* right output lens
108 reflective surface
108*l* left reflective surface
108*r* right reflective surface
110 optical assembly
110*l* left optical assembly
110*r* right optical assembly
112*l* left turning mirror
112*r* right turning mirror
170 image generation system
170*l* left image generation system
170*r* right image generation system

The invention claimed is:

1. An autostereoscopic optical apparatus for viewing a stereoscopic image comprising a left image to be viewed by an observer at a left viewing pupil and a right image to be viewed by the observer at a right viewing pupil, the apparatus comprising:
   (a) a left image generation system for forming a left curved intermediate image near the focal surface of a curved mirror, the left image generation system comprising:
      (i) a left image source comprising an emissive or transmissive display for forming a left source image;
      (ii) a left optical system comprising at least one lens for collecting light from the left image source and a left image folding surface for directing the collected light to form the left curved intermediate image, wherein the left optical system forms an exit pupil optically centered near the center of curvature of the left curved intermediate image;
   (b) a right image generation system for forming a right curved intermediate image near the focal surface of the curved mirror, the right image generation system comprising:
      (i) a right image source comprising an emissive or transmissive display for forming a right source image;
      (ii) a right optical system comprising at least one lens for collecting light from the right image source and a right image folding surface for directing the collected light to form the right curved intermediate image, wherein the right optical system forms an exit pupil optically centered near the center of curvature of the right curved intermediate image;
   (c) the center of curvature of the curved mirror placed substantially optically midway between the exit pupil of the left optical system and exit pupil of the right optical system;
   (d) a beamsplitter disposed between the mirrored surface and the center of curvature of the curved mirror, the curved mirror and beamsplitter cooperating to form, at the left viewing pupil:
      (i) a real image of the exit pupil of the left optical system; and
      (ii) an image of the left curved intermediate image that appears to be behind the curved mirror;
   the curved mirror and beamsplitter further cooperating to form, at the right viewing pupil:
      (i) a real image of the exit pupil of the right optical system;
      (ii) an image of the right curved intermediate image that appears to be behind the curved mirror; and
   wherein the left image source is greater than four inches in diameter.

2. An autostereoscopic optical apparatus according to claim 1 further comprising a prism optically coupled with the left image folding surface.

3. An autostereoscopic optical apparatus according to claim 1 wherein the left image folding surface is disposed substantially at the aperture stop of the left optical system.

4. An autostereoscopic optical apparatus according to claim 1 wherein the left image folding surface is a mirror.

5. An autostereoscopic optical apparatus according to claim 1 wherein at least one of the left and right source images is pre-distorted to correct optical distortion.

6. An autostereoscopic optical apparatus-for viewing a stereoscopic image comprising a left image to be viewed by an observer at a left viewing pupil and a right image to be viewed by the observer at a right viewing pupil, the apparatus comprising:
   (a) a left image generation system for forming a left curved intermediate image near the focal surface of a curved mirror, the left image generation system comprising:
      (i) a left image source for forming a left source image;
      (ii) a left optical system comprising at least one lens for collecting light from the left image source and a left image folding surface for directing the collected light to form the left curved intermediate image, wherein the left optical system forms an exit pupil optically centered near the center of curvature of the left curved intermediate image;

(b) a right image generation system for forming a right curved intermediate image near the focal surface of the curved mirror, the right image generation system comprising:
  (i) a right image source for forming a right source image;
  (ii) a right optical system comprising at least one lens for collecting light from the right image source and a right image folding surface for directing the collected light to form the right curved intermediate image, wherein the right optical system forms an exit pupil optically centered near the center of curvature of the right curved intermediate image;
(c) the center of curvature of the curved mirror placed substantially optically midway between the exit pupil of the left optical system and exit pupil of the right optical system;
(d) a beamsplitter disposed between the mirrored surface and the center of curvature of the curved mirror, the curved mirror and beamsplitter cooperating to form, at the left viewing pupil:
  (i) a real image of the exit pupil of the left optical system; and
  (ii) an image of the left curved intermediate image that appears to be behind the curved mirror;
the curved mirror and beamsplitter further cooperating to form, at the right viewing pupil:
  (i) a real image of the exit pupil of the right optical system;
  (ii) an image of the right curved intermediate image that appears to be behind the curved mirror; and
wherein the aperture stop and exit pupil of the left optical system are farther than 4 mm apart.

7. An autostereoscopic optical apparatus for viewing a stereoscopic image comprising a left image to be viewed by an observer at a left viewing pupil and a right image to be viewed by the observer at a right viewing pupil, the apparatus comprising:
  (a) a left image generation system for forming a left curved intermediate image near the focal surface of a curved mirror, the left image generation system comprising:
    (i) a left image source for forming a left source image;
    (ii) a left optical system comprising at least one lens for collecting light from the left image source and a left image folding surface for directing the collected light to form the left curved intermediate image, wherein the left optical system forms an exit pupil optically centered near the center of curvature of the left curved intermediate image;
  (b) a right image generation system for forming a right curved intermediate image near the focal surface of the curved mirror, the right image generation system comprising:
    (i) a right image source for forming a right source image;
    (ii) a right optical system comprising at least one lens for collecting light from the right image source and a right image folding surface for directing the collected light to form the right curved intermediate image, wherein the right optical system forms an exit pupil optically centered near the center of curvature of the right curved intermediate image;
  (c) the center of curvature of the curved mirror placed substantially optically midway between the exit pupil of the left optical system and exit pupil of the right optical system;
  (d) a beamsplitter disposed between the mirrored surface and the center of curvature of the curved mirror, the curved mirror and beamsplitter cooperating to form, at the left viewing pupil:
    (i) a real image of the exit pupil of the left optical system; and
    (ii) an image of the left curved intermediate image that appears to be behind the curved mirror;
  the curved mirror and beamsplitter further cooperating to form, at the right viewing pupil:
    (i) a real image of the exit pupil of the right optical system;
    (ii) an image of the right curved intermediate image that appears to be behind the curved mirror; and
  wherein the diameter of the output lens of the left optical system is in the range of 65–200 mm.

8. An autostereoscopic optical apparatus for viewing a stereoscopic image comprising a left virtual image to be viewed by an observer at a left viewing pupil and a right virtual image to be viewed by the observer at a right viewing pupil, the apparatus comprising:
  (a) a left image generation system for forming a left curved intermediate image near the focal surface of a curved mirror, the left image generation system comprising:
    (i) a left image source comprising an emissive or transmissive display for forming a left source image;
    (ii) a left optical system comprising at least one lens for collecting light from the left image source and a left image folding surface for directing the collected light to form the left curved intermediate image, wherein the left optical system forms an exit pupil optically centered near the center of curvature of the left curved intermediate image;
  (b) a right image generation system for forming a right curved intermediate image near the focal surface of the curved mirror, the right image generation system comprising:
    (i) a right image source comprising an emissive or transmissive display for forming a right source image;
    (ii) a right optical system comprising at least one lens for collecting light from the right image source and a right image folding surface for directing the collected light to form the right curved intermediate image, wherein the right optical system forms an exit pupil optically centered near the center of curvature of the right curved intermediate image;
  (c) the center of curvature of the curved mirror placed substantially optically midway between the exit pupil of the left optical system and exit pupil of the right optical system;
  (d) a beamsplitter disposed between the mirrored surface and the center of curvature of the curved mirror, the curved mirror and beamsplitter cooperating to form, at the left viewing pupil:
    (i) a real image of the exit pupil of the left optical system;
    (ii) a virtual image of the left curved intermediate image;
  the curved mirror and beamsplitter further cooperating to form, at the right viewing pupil:
    (i) a real image of the exit pupil of the right optical system;
    (ii) a virtual image of the right curved intermediate image; and wherein the left image source is greater than four inches in diameter.

9. A method for forming an autostereoscopic image comprising a left image to be viewed by an observer at a left viewing pupil and a right image to be viewed by the observer at a right viewing pupil, the method comprising:
(a) forming a left curved intermediate image near the focal surface of a curved mirror by:
   (i) forming a left source image from a left image source comprising an emissive or transmissive display;
   (ii) collecting light from the left image source and folding the light path at a reflective surface to form the left curved intermediate image, whereby a left exit pupil is optically centered near the center of curvature of the left curved intermediate image;
(b) forming a right curved intermediate image near the focal surface of the curved mirror by:
   (i) forming a right source image from a right image source comprising an emissive or transmissive display;
   (ii) collecting light from the right image source and folding the light path at a reflective surface to form the right curved intermediate image, whereby a right exit pupil is optically centered near the center of curvature of the right curved intermediate image;
wherein the center of curvature of the curved mirror is substantially optically midway between the exit pupil of the left and right optical paths;
(c) disposing a beamsplitter between the mirrored surface and the center of curvature of the curved mirror, the curved mirror and beamsplitter cooperating to form, at the left viewing pupil:
   (i) a real image of the left exit pupil of a left prism; and
   (ii) a virtual image of the left curved intermediate image that appears to be behind the curved mirror;
the curved mirror and beamsplitter further cooperating to form, at the right viewing pupil:
   (i) a real image of the right exit pupil of a right prism;
   (ii) a virtual image of the right curved intermediate image that appears to be behind the curved mirror; and
wherein the left image source is greater than four inches in diameter.

10. A method for forming an autostereoscopic image according to claim 9 wherein the left source image comprises an LCD or OLED.

11. A method for forming an autostereoscopic image according to claim 9 wherein the step of forming a left source image comprises the step of energizing an emissive display.

12. A method for forming an autostereoscopic image according to claim 9 wherein the step of forming a left source image comprises the step of energizing a CRT.

13. A method for forming an autostereoscopic image according to claim 9 wherein the step of forming a left source image comprises the step of energizing an OLED.

14. A method for forming an autostereoscopic image according to claim 9 wherein the step of forming a left source image comprises the step of projecting an image.

15. A method for forming an autostereoscopic virtual image comprising a left image to be viewed by an observer at a left viewing pupil and a right image to be viewed by the observer at a right viewing pupil, the method comprising:
(a) forming a left curved intermediate image near the focal surface of a curved mirror by:
   (i) forming a left source image from a left image source comprising an emissive or transmissive display;
   (ii) collecting light from the left image source and folding the light path at a reflective surface to form the left curved intermediate image, whereby a left exit pupil is optically centered near the center of curvature of the left curved intermediate image;
(b) forming a right curved intermediate image near the focal surface of the curved mirror by:
   (i) forming a right source image from a right image source comprising an emissive or transmissive display;
   (ii) collecting light from the right image source and folding the light path at a reflective surface to form the right curved intermediate image, whereby a right exit pupil is optically centered near the center of curvature of the right curved intermediate image:
wherein the center of curvature of the curved mirror is substantially optically midway between the exit pupil of the left and right optical paths;
(c) disposing a beamsplitter between the mirrored surface and the center of curvature of the curved mirror, the curved mirror and beamsplitter cooperating to form, at the left viewing pupil:
   (i) a real image of the left exit pupil of a left prism;
   (ii) a virtual image of the left curved intermediate image;
the curved mirror and beamsplitter further cooperating to form, at the right viewing pupil:
   (i) a real image of the right exit pupil of a right prism;
   (ii) a virtual image of the right curved intermediate image; and
wherein the left image source is greater than four inches in diameter.

* * * * *